(12) United States Patent
Woyciesjes

(10) Patent No.: US 7,754,097 B2
(45) Date of Patent: Jul. 13, 2010

(54) METHOD FOR STABILIZING AN ENGINE COOLANT CONCENTRATE AND PREVENTING HARD WATER SALT FORMATION UPON DILUTION

(75) Inventor: Peter M. Woyciesjes, Woodbury, CT (US)

(73) Assignee: Honeywell International Inc., Morristown, NJ (US)

( * ) Notice: Subject to any disclaimer, the term of this patent is extended or adjusted under 35 U.S.C. 154(b) by 246 days.

(21) Appl. No.: 11/464,356

(22) Filed: Aug. 14, 2006

(65) Prior Publication Data

US 2007/0034826 A1      Feb. 15, 2007

Related U.S. Application Data

(60) Provisional application No. 60/707,589, filed on Aug. 12, 2005.

(51) Int. Cl.
C09K 5/00 (2006.01)
(52) U.S. Cl. .............................. 252/79; 252/70; 252/71; 252/73; 252/74; 252/75; 252/76; 252/77; 252/78.1; 252/78.5
(58) Field of Classification Search .............. 252/70–79
See application file for complete search history.

(56) References Cited

U.S. PATENT DOCUMENTS

| | | | |
|---|---|---|---|
| 3,563,895 A * | 2/1971 | Janatka et al. .............. 508/507 |
| 3,663,448 A | 5/1972 | Ralston et al. | |
| 3,948,792 A | 4/1976 | Watsen et al. | |
| 4,046,707 A | 9/1977 | Smith et al. | |
| 4,457,852 A | 7/1984 | Bosen | |
| 4,487,712 A * | 12/1984 | Wilson et al. .............. 252/78.3 |
| 4,613,450 A * | 9/1986 | Moran et al. ................ 252/181 |
| 4,664,833 A | 5/1987 | Cassin et al. | |
| 4,725,405 A | 2/1988 | Cassin et al. | |
| 4,744,913 A * | 5/1988 | Salvador et al. ............... 252/70 |
| 5,118,434 A * | 6/1992 | Meyer et al. .................. 252/70 |
| 5,389,276 A * | 2/1995 | Coffey et al. ................. 252/70 |
| 5,454,967 A * | 10/1995 | Pfitzner et al. ............. 252/78.5 |
| 5,725,794 A | 3/1998 | Bruhnke et al. | |
| 5,741,436 A | 4/1998 | Gershun et al. | |
| 5,750,047 A * | 5/1998 | Lemma ........................ 252/70 |
| 5,925,173 A | 7/1999 | Frost et al. | |
| 5,929,008 A | 7/1999 | Goldstein | |
| 5,968,407 A | 10/1999 | Boluk et al. | |
| 6,228,283 B1 | 5/2001 | Turcotte et al. | |
| 6,290,870 B1 | 9/2001 | Turcotte et al. | |
| 6,379,582 B1 * | 4/2002 | Putman ....................... 252/70 |
| 6,607,694 B1 | 8/2003 | Blakemore et al. | |
| 2001/0050191 A1 | 12/2001 | Ogawa et al. | |
| 2002/0031693 A1 | 3/2002 | Ishikawa | |
| 2003/0072981 A1 | 4/2003 | Imaseki et al. | |
| 2004/0001984 A1 | 1/2004 | Alva | |
| 2004/0028963 A1 | 2/2004 | Kormann et al. | |
| 2004/0028971 A1 | 2/2004 | Wenderoth et al. | |
| 2004/0086757 A1 | 5/2004 | Mohapatra | |

FOREIGN PATENT DOCUMENTS

| | | |
|---|---|---|
| CA | 2344856 | 3/2000 |
| CA | 2430443 | 7/2000 |
| CA | 2445792 | 2/2002 |
| CA | 2435593 | 8/2002 |
| CA | 2449208 | 8/2006 |
| EP | 0027870 A1 | 5/1981 |
| EP | 0081738 | 6/1983 |
| EP | 0111013 | 6/1984 |
| EP | 0245557 A2 | 11/1986 |
| EP | 0245557 B1 | 3/1991 |
| EP | 1262535 A1 | 12/2002 |
| EP | 1304367 | 4/2003 |
| EP | 1416563 A1 | 5/2004 |
| GB | 2058120 | 4/1981 |

(Continued)

OTHER PUBLICATIONS

International Search Report dated Nov. 16, 2006 for International Application No.PCT/US2006/031420, International Filing Date Aug. 14, 2006.

(Continued)

*Primary Examiner*—Mark Eashoo
*Assistant Examiner*—Jane L Stanley
(74) *Attorney, Agent, or Firm*—Cantor Colburn LLP

(57) ABSTRACT

Disclosed is a method of simultaneously stabilizing an engine coolant concentrate and preventing hard water salt formation upon dilution of the coolant concentrate with hard water. The method comprises making a stabilized concentrate by adding to a coolant concentrate at least one stabilizer selected from the group consisting of polyacrylate polymers of the formula:

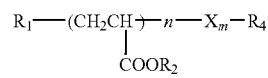

where $R_1$ is H; $R_4$ is a terminating group; X is

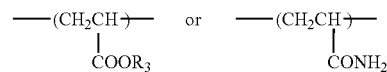

and $R_2$ and $R_3$ are each independently hydrogen, an alkali metal or an alkaline earth metal, and the sum of m and n provide a number average equivalent weight of less than 6500, and a number average molecular weight of less than 6500, the concentrate comprising 90 or more wt % freezing point depressant and then diluting the stabilized coolant concentrate with hard water to provide a final coolant composition.

20 Claims, No Drawings

FOREIGN PATENT DOCUMENTS

| | | |
|---|---|---|
| JP | 8185877 | 7/1996 |
| WO | 9961545 | 12/1999 |
| WO | 0017951 | 3/2000 |
| WO | 02055630 A1 | 7/2002 |
| WO | 02090462 A1 | 11/2002 |
| WO | 02101848 A2 | 12/2002 |
| WO | 02101848 A3 | 12/2002 |
| WO | 03033616 A1 | 4/2003 |
| WO | 03061044 A2 | 7/2003 |
| WO | 03061044 A3 | 7/2003 |
| WO | 03070854 A1 | 8/2003 |

OTHER PUBLICATIONS

Written Opinion Of The International Searching Authority dated Nov. 16, 2006 for International Application No. PCT/US2006/031420, International Filing Date Aug. 14, 2006.

\* cited by examiner

METHOD FOR STABILIZING AN ENGINE COOLANT CONCENTRATE AND PREVENTING HARD WATER SALT FORMATION UPON DILUTION

CROSS REFERENCE TO RELATED APPLICATION

The application claims the benefit of U.S. Provisional application, Ser. No. 60/707,589, filed Aug. 12, 2005, the contents of which are incorporated herein by reference thereto.

FIELD OF THE INVENTION

The invention is directed to the stabilization of coolants for internal combustion engines. More particularly, the invention is directed toward the stabilization of engine coolant concentrates and the prevention of hard water salt formation upon dilution of the stabilized engine coolant concentrate with hard water.

BACKGROUND OF THE INVENTION

Automobile engine cooling systems contain a variety of metals, including copper, solder, brass, steel, cast iron and aluminum. The possibility of corrosive attack on such metals is high, due to the presence of various ions as well as the high temperatures, pressures, and flow rates found in such cooling systems. The presence of corrosion products within the cooling system can interfere with heat transfer from the engine combustion chambers, and may subsequently cause engine overheating and engine component failure due to excess metal temperatures.

To prevent these problems, a variety of organic and inorganic compositions have been employed as corrosion inhibitors in engine coolant formulations. Illustrative examples of corrosion inhibitors used in engine coolant formulations include silicates, phosphates, organic acids and their salts, azole type compounds, molybdenum, nitrates, nitrites, borates, and the like, as well as combinations thereof.

However, many engine coolant formulations experience a variety of problems commonly attributed to the presence of corrosion inhibitors. Coolants are often provided in the form of concentrates that must be diluted with water prior to use in an automobile engine cooling system.

In some cases, engine coolant concentrates exhibit instability issues after extended warehouse or shelf storage. One common manifestation of storage instability in a coolant concentrate is inhibitor fallout in the form of precipitates. Corrosion inhibitors that are no longer part of a homogenous coolant concentrate will be unavailable in the diluted coolant. A diluted coolant made from an unstable concentrate will thus provide an engine with less corrosion protection.

Another problem encountered with engine coolant concentrates involves the water used for dilution. In many areas the only water available for such use is hard water, or water that contains appreciable levels of dissolved salts. Hardness of water is a function of the concentration of dissolved calcium and magnesium salts contained in the water, and is usually expressed in terms of a concentration (ppm) as $CaCO_3$ Total Hardness. Hard water as used herein refers to water having greater than 150 ppm $CaCO_3$ total hardness. In many cases, the use of hard water for the dilution of coolant concentrates results in a coolant that has adverse effects upon the overall cooling system.

For example, EP 0 245 557 B1 discloses that the use of hard water to dilute antifreeze/coolant formulations containing alkali metal silicate and borate corrosion inhibitors causes the formation of insoluble alkali earth metal silicate floes which precipitate from the antifreeze-water solution. The resulting metal silicate floes are said to be calcium and/or magnesium silicate salts that adversely affect the cooling system for several reasons. First, since the precipitates are alkali earth metal silicate floes, a rapid deletion of silicate in solution occurs; thus the corrosion-inhibiting properties of the formulation are depleted. Moreover, the precipitating solids can eventually plug the passages of the engine cooling system. Second, the formation of hard water scale is undesirable because it can interfere with heat transfer from the engine combustion chambers, and subsequently may cause engine overheating and engine component failure due to excess metal temperatures. EP 0 245 557 B1 discloses the use of phosphino polycarboxylic acid/polycarboxylate compositions, or mixtures thereof as stabilizers to prevent the precipitation of insoluble alkali earth metal silicate and borate corrosion inhibitors where said formulations are diluted with hard water.

However, EP 0 245 557 B1 is limited to the prevention of hard water salts in coolants having only certain corrosion inhibitors. Moreover, none of the prior art has simultaneously resolved the dual problems of coolant concentrate storage stability and the formation of hard water salt formation upon dilution of the concentrate with hard water.

Accordingly, there continues to be a need for the stabilization of coolant concentrates for internal combustion engines.

More particularly, there continues to be a need for methods and compositions directed toward the prevention of the formation of hard water salts upon dilution of engine coolant concentrates with hard water.

Most particularly, there continues to be a need for methods and compositions directed toward the simultaneous stabilization of coolant concentrates and the prevention of hard water salt formation upon dilution of a stabilized engine coolant concentrate with hard water.

SUMMARY OF THE INVENTION

The invention provides coolant concentrates stabilized with a particular stabilizer additive. It has unexpectedly been found that coolant concentrates stabilized with at least one of the particularly identified stabilizers have improved shelf stability, particularly in regards to shelf stability at elevated temperatures.

In addition, it has unexpectedly been found that the particularly stabilized coolant concentrates can be diluted with hard water to provide a coolant that fails to form hard water salts.

Disclosed is a coolant concentrate comprising one or more corrosion inhibitors and at least one stabilizer selected from the group consisting of polyacrylate polymers of the formula:

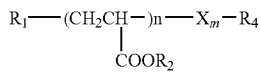

where $R_1$ is H; $R_4$ is H, hydroxyl, alkyl, or another terminating group; X is

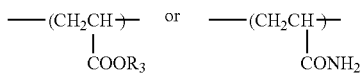

and $R_2$ and $R_3$ are each independently hydrogen, an alkali metal or an alkaline earth metal, and the sum of m and n provide a number average equivalent weight of less than 6500, wherein the coolant concentrate comprises at least 90 wt % glycol, based on the total weight of the coolant concentrate.

Also disclosed is a method for preventing hard water salt formation upon dilution of a coolant concentrate with hard water, comprising diluting the disclosed concentrate with hard water to provide a final coolant comprising at least 75 wt % water.

A method of stabilizing a coolant is also disclosed, the method comprising adding to a coolant at least one stabilizer selected from the group consisting of polyacrylate polymers of the formula:

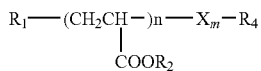

where $R_1$ is H; $R_4$ is H, hydroxyl, alkyl, or another terminating group; X is

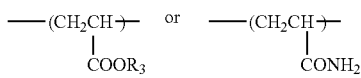

and $R_2$ and $R_3$ are each independently hydrogen, an alkali metal or an alkaline earth metal, and the sum of m and n provide a number average equivalent weight of less than 6500, and a number average molecular weight of less than 6500.

Finally, a method of stabilizing an engine coolant concentrate and preventing hard water salt formation upon dilution of the coolant concentrate with hard water is disclosed, comprising adding to a coolant concentrate at least one stabilizer of the formula:

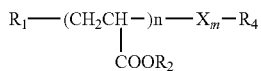

where $R_1$ is H; $R_4$ is H, hydroxyl, alkyl, or another terminating group; X is

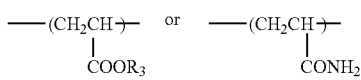

and $R_2$ and $R_3$ are each independently hydrogen, an alkali metal or an alkaline earth metal, and the sum of m and n provide a number average equivalent weight of less than 6500, the concentrate comprising at least 90 wt % glycol to provide a stabilized coolant concentrate, and diluting the stabilized coolant concentrate with hard water to provide a final coolant having an initial concentration of hard water salt insoluble precipitates of less than 50 ppm.

DETAILED DESCRIPTION OF THE PREFERRED EMBODIMENTS

The disclosed coolant concentrates generally comprise a freezing point-depressing agent in range of about 90% to 99% by weight; coolant corrosion inhibitors; the disclosed stabilizers; and optionally other coolant additives, such as anti-foam agents, colorants, dispersants, anti-scaling agents, wetting agents, pH adjusting and buffering agents and the like.

The freezing point depressant suitable for use includes alcohol or mixture of alcohols, such as monohydric or polyhydric alcohols and mixture thereof. In one embodiment, the freezing point depressant will be polyhydric alcohol, especially a mixture of polyhydric alcohols.

Illustrative examples of suitable freezing point depressants include methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, momoethylene of glycerol, sorbitol, 1,2,6-hexanetriol, trimethylopropane, alkoxy alkanols such as methoxyethanol and mixtures thereof.

In one embodiment, the freezing point depressant will be at least one of ethylene glycol, diethylene glycol, 1,2propylene glycol, 1,3-propylene glycol and combinations comprising one or more of the foregoing. In one exemplary embodiment, the freezing point depressant will comprise a combination of one or more of ethylene glycol, diethylene glycol, 1,3-propylene glycol and/or 1,2-propylene glycol.

In one embodiment, the freezing point depressant is present in the coolant concentrate composition in an amount of about 90% to about 99.9% (by weight). In another embodiment, the freezing point depressant is present in the coolant concentrate in an amount of about 91% to 98%. In one exemplary embodiment, the freezing point depressant is present in the coolant concentrate in an amount of about 91% to about 95% by weight.

After dilution of the coolant concentrate, the freezing point depressant is present in the resulting coolant composition (also referred to herein as a diluted coolant or final coolant) in an amount of less than 90% to about 10%, based on the total weight of the coolant composition. In another embodiment, the freezing point depressant is present in the coolant composition in an amount of from about 70% to 30%, based on the final weight of the coolant composition. In one exemplary embodiment, the freezing point depressant is present in the coolant composition, i.e., a diluted or final coolant, in an amount of about 60% to 40% by weight, based on the final weight of the coolant composition.

Coolants may differ in the type(s) of corrosion inhibitors added to them. Conventional coolants may be based on silicate(s) as a primary corrosion inhibitor. Extended life coolants may include organic acid(s) as a primary corrosion inhibitor. Hybrid coolants may be based on a combination of components from conventional and/or extended life anti-freeze/coolants. In one embodiment, the corrosion inhibitors useful in the disclosed coolant concentrates and coolant compositions include those corrosion inhibitors known to be useful, and combinations thereof. Illustrative examples of suitable corrosion inhibitors generally include organic acids such as di-carboxylic acids, carboxylates, and salts thereof; azole type compounds such as triazoles and thiazoles; and silicates, phosphates, nitrates, nitrites, borates, benzoates, molybdates, or alkali metal or alkaline earth metal salts thereof an the like, as well as combinations of two or more of the foregoing.

In one embodiment, the corrosion inhibitors employed in the disclosed coolants and compositions will comprise at least one of silicates, phosphates, the alkali metal or alkaline earth metal salts thereof, and combinations of two or more of the foregoing; as well as one more additional corrosion inhibitors selected from the group consisting of organic acids such as di-carboxylic acids, carboxylates, and salts thereof; azole type compounds such as triazoles and thiazoles; nitrates; nitrites; borates; benzoates; molybdates; or alkali metal or alkaline earth metal salts thereof; and combinations of two or more of the foregoing additional corrosion inhibitors.

In one exemplary embodiment, the corrosion inhibitors employed in the disclosed coolants and compositions will comprise a combination of (i) and (ii) wherein (i) is one or more silicates or the alkali metal or alkaline earth metal salts of one or more silicates and (ii) is one or more phosphates or the alkali metal or alkaline earth metal salts of one or more phosphate compounds; as well as one or more additional corrosion inhibitors selected from the group consisting of organic acids such as di-carboxylic acids, carboxylate, and salts thereof; azole type compounds such as triazoles and thiazoles; nitrates; nitrites; borates; benzoates; molybdates; or alkali metal or alkaline earth metal salts thereof; and combinations of two or more of the foregoing additional corrosion inhibitors.

In one especially exemplary embodiment, the corrosion inhibitors employed in the disclosed coolants and compositions will comprise at least one phosphate or the alkali metal or alkaline earth metal salts thereof; as well as one or more additional corrosion inhibitors selected from the group consisting of organic acids such as di-carboxylic acids, carboxylates, and salts thereof; azole type compounds such as triazoles and thiazoles; nitrates; nitrites; borates; benzoates; molybdates; or alkali metal or alkaline earth metal salts thereof; and combinations of two or more of the foregoing additional corrosion inhibitors.

Non-limitative examples of suitable organic acids include, but are not limited to aliphatic and/or aromatic mono- and/or discarboxylic acids such as 2-ethylhexanoic acid, benzoic acids, t-butyl benzoic acid, sebacic acids, nonanoic acids, dodecanoic acids, neodecanoic acids, and mixtures thereof.

Suitable carboxylates include saturated and unsaturated aliphatic, and aromatic mono-, di- and tricarboyxlic acids, and salts and isomers thereof, and any mixture thereof. Particularly, the suitable carboxylates include $C_4$ to $C_{12}$ mono-, or di-carboxylic acids, such as 2-ethyl hexanoic acid, neodecanoic acid, benzoic acid, t-butylbenzoic acid, dodecanediodic acid, and sebacic acid, or alkali and alkali earth metal, ammonium and amine salts, or isomers and mixtures thereof.

For example, in one embodiment, illustrative examples of suitable organic acids are acids such as 2-ethylhexanoic acid ("2-EHA") or neo-octanoic acid, or isomers and/or salts thereof, and neo-decanoic acid, or isomers and/or salts thereof. As with neo-decanoic acid, 2-EHA and neo-octanoic acid are less expensive than sebacic acid and more readily available (2-EHA may be obtained from, for example, ALLCHEM Industries, Inc., ASHLAND Chemical Co., BASF Corp., Brook-Chem Inc., EASTMAN Chemical Group and Dow Chemical Corp.; neo-octanoic acid is available from, for example. Exxon Chemical Company). Also, these mono-carboxylic acids are available as liquids rather than solids (as is sebacic acid) and as such, they are more easily used to prepare corrosion inhibitors on a commercial scale.

In another embodiment, as illustrative organic acid is a cyclohexenoic acid component having the structure:

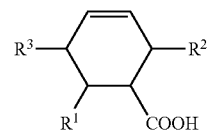

wherein each of $R^1$, $R^2$ and $R^3$ is, independently, selected from the group consisting of H, OH, COOH, $C^1$-$C^{10}$ alkyl groups, glycol esters, or combination thereof. Where the substituents comprise a $C^1$-$C^{10}$ alkyl group, more preferred alkyl groups have up to six carbon atoms because such groups are believed to result in cyclohexenoic acids having improved miscibility in the antifreeze composition.

For the cyclohexenoic acid component, $R^1$ is preferably H or COOH (with COOH more preferred), $R^3$ preferably comprises a $C_1$-$C_{10}$ alkyl group, and $R^2$ preferably has the structure:

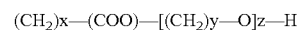

wherein
x is from 0 to 10;
y is from 1 to 5; and
z is from 0 to 5.

Preferably, z is 0-2, more preferably z is 1 or 2, and even more preferably z is 2. Examples of useful cyclohexenoic acids include:

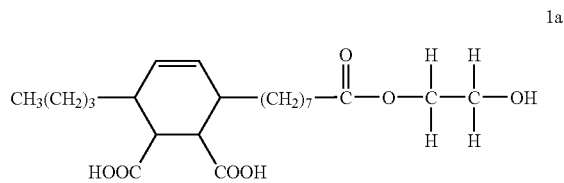

1a

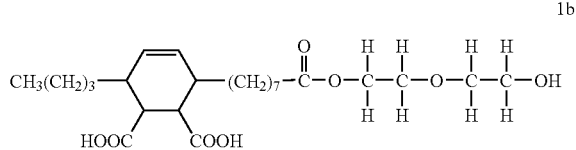

1b

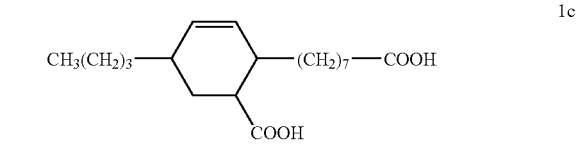

1c

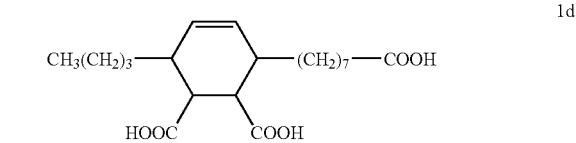

1d

The acid components of the corrosion inhibitors of this invention may alternatively be in the form of an alkali metal salt, ammonium salt or amine salt. Preferred salts are the alkali metal salts, and most preferred are sodium or potassium salts of the mono-carboxylic acids.

In one embodiment, the disclosed coolant concentrates and coolant compositions comprise compounds containing 5- or 6-member heterocyclic ring as the active functional group, wherein the heterocyclic ring contains at least one nitrogen atom, for example, an azole compound. Particularly, benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, trazole and substituted tetrazoles, and mixtures thereof can be used as corrosion inhibitors.

The azole compound or mixture may be present in the coolant concentrates in an amount of from about 1 ppm to about 8000 ppm, while in one exemplary embodiment, they will be present in an amount of about 10 ppm to about 5000 ppm.

An illustrative example of a suitable silicate based corrosion inhibitor is an organosiloxane/silicate copolymer present in an amount of from 0.01 percent to 10 percent by weight based upon the weight of the coolant concentrate and consisting essentially of:

(1) from 0.1 to 99.9 parts by weight of at least one member selected from the group consisting of (a) siloxane groups represented by the formula:

wherein R is a member selected from the group consisting of the methyl, ethyl, propyl, phenyl and vinyl groups and (b) siloxane groups represented by the formula:

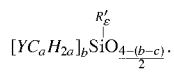

wherein Y is a member selected from the groups consisting of halogen containing groups, cyano containing groups, aryl containing groups, amino containing groups, glycidoxy containing groups, carboxy ester containing groups, glycidoxy containing groups, mercapto containing groups, hydroxy and polyhydroxy containing groups, and mixtures thereof, a is an integer having a value of at least 1, the group represented by Y is separated from the silicon atom by at least two successive carbon atoms, b is an integer having a value of from 1 to 3 inclusive, R' is a monovalent hydrocarbon group, c is an integer having a value from 0 to 2 inclusive, (b+c) has a value from 1 to 3 inclusive; and (2) from 0.1 to 99.9 parts by weight of at least one silicate group represented by the formula:

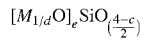

wherein M is a cation that forms a water soluble silicate, d is the valence of the cation represented by M and has a value of at least 1 and e has a value from 1 to 3 inclusive, said parts by weight of said groups in the copolymer being based on 100 parts by weight of the copolymer, the improvement comprising said composition additionally containing at least one nitrate salt, in the absence of nitrate, in an amount sufficient to provide aluminum corrosion protection.

Typical "Y" substituents would include, for example, $CF_3$, CN, $NH_2$, Cl, COOH, SH, $CH_2(O)CHCH_2(O)$, $NH_2CH_2CH_2NH$, $CH_3OOC$, $CH_3COO$, $(CH_2CH_2)_n$, $CH_3OOCCH_2CH_2NHCH_2CH_2NH$, carbohydrates, $CH_2(OH)CH(OH)$, $CH_2(OH)CH(OH)CH_2$,

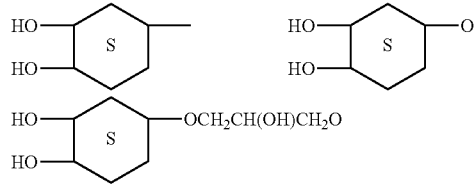

$CH_2(OH)CH(OH)CH_2O$, $CH_2(OH)CH(OH)CH_2OCH_2CH(OH)CH_2O$, $CH_2(OH)CH_2OCH_2CH(OH)CH_2O$, $R"(OCH_2CH_2)_n(OC_3H_6)_mO$ and $R"(OCH_2CH_2)_n(OC_3H_6)mOCH_2CH(OH)CH_2O$ and the like, wherein R" is a member selected from the group consisting of the monovalent hydrocarbon and the hydrogen atom, and n and m are integers having a value of from 0 to 20 inclusive.

In another aspect of the invention, the above-described organosiloxane/silicate copolymer composition additionally contains from 0.1 to 99.8 parts by weight of at least one siloxane group selected from the group consisting of the groups represented by the formula:

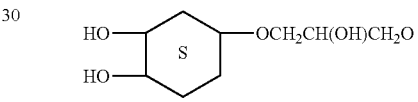

wherein R'" is a monovalent hydrocarbon group other than the methyl, ethyl, propyl, phenyl and vinyl groups and R' has the above-defined meaning, said parts by weight of said groups in the copolymer being based on 100 parts by weight of the copolymer.

Illustrative examples of suitable phosphate compounds include those commonly known in the art such as phosphoric acid and the neutralized salts thereof. In one embodiment, the phosphate compound will comprise an alkaline earth metal salt or an alkali metal salt of phosphoric acid. In one exemplary embodiment, the phosphate compound will be sodium phosphate or potassium phosphate. It will be appreciate that such phosphate compounds may be added to the coolant concentrate or coolant composition directly in the salt form or prepared in situ via the addition of the acid form, i.e., phosphoric acid, and an appropriate neutralizer such as sodium hydroxide or potassium hydroxide. In one especially exemplary embodiment, the corrosion inhibitors employed will comprise phosphate compounds that are alkaline earth salts prepared in situ in either the coolant concentrate or coolant composition.

In one embodiment, the disclosed coolant concentrates and coolant compositions comprise benzoates as corrosion inhibitors. Suitable examples of benzoates for use as corrosion inhibitors include, but are not limited to, alkaline earth metal benzoates such as sodium benzoate and potassium benzoate, ammonium benzoate, amine benzoates (e.g. diethylamine benzoate), cycloaliphatic amine benzoates (e.g. cyclohexylamine benzoate), and alkanolamine benzoates (e.g. triethenolamine benzoate). In one embodiment, the corrosion inhibitors will comprise benzoates selected from the group consisting of sodium benzoate, potassium benzoate, and mixtures thereof.

In one embodiment, the corrosion inhibitors employed in the disclosed coolants and compositions will comprise at least one silicates, phosphates, the alkali metal or alkaline earth metal salts thereof, and combinations of two or more of the foregoing. In one embodiment, the silicates may be present in an amount of from 0.05 to 0.8% by weight, based on the total weight of the coolant concentrate, while in another embodiment, they will be present in an amount of from 0.1 to 0.5% by weight, based on the total weight of the coolant concentrate. In one embodiment, the phosphates may be present in an amount of from 0.1 to 1.2% by weight, based on the total weight of the coolant concentrate, while in another embodiment, they will be present in an amount of from 0.3 to 0.7% by weight, based on the total weight of the coolant concentrate.

In one embodiment, the total amount of all corrosion inhibitors present in a coolant concentrate will be from about 0.1 to about 10% by weight, based on the total weight of the coolant concentrate. In another embodiment, the total amount of corrosion inhibitors present will be from about 1 to about 8% by weight, based on the total weight of the coolant concentrate. In one exemplary embodiment, the total amount of corrosion inhibitors present will be from about 2 to about 4% by weight, based on the total weight of the coolant concentrate.

The disclosed coolant concentrates and coolant compositions comprise at least one stabilizer selected from the group consisting of certain acid functional or ionic group functional polyacrylate polymers. The term 'polyacrylate polymers' as used herein refers to both homopolymers and copolymers resulting from the free radical polymerization of acrylic acid and/or (meth)acrylic acid monomers. In the case of copolymers, the acrylic acid and/or (meth)acrylic acid monomers may be copolymerized with other unsaturated monomers, including alkyl esters, hydroxyl substituted alkyl esters, and the like.

The stabilizers or stabilizing agents used herein will comprise acid groups or the neutralized salt groups thereof, i.e., ionic groups. In one exemplary embodiment, the stabilizing agent used herein will comprise ionic groups. If acid functional stabilizing agents are used, an appropriate amount of neutralizing agent will be used to neutralize at least 90% of the acid groups present, i.e., to convert the acid groups to salt groups. In another embodiment, an appropriate amount of neutralizing agent will be used to neutralize substantially all of acid groups present in the stabilizing agent. In one exemplary embodiment, the functionalized form of the stabilizing agent is a neutralized salt, whether as added or as present in the concentrate after the addition of a neutralizing agent.

In one embodiment, the stabilizing agents used will comprise ionic groups comprising alkali metals or alkali earth metals. In one embodiment, the stabilizing agent will comprise alkali metals. In one exemplary embodiment, the stabilizing agent will comprise sodium polyacrylic acid polymers, i.e., polyacrylic acid polymers wherein the acid groups have been neutralized with a material such as sodium hydroxide to provide sodium salts.

In one embodiment, the stabilizing agent will be of the formula:

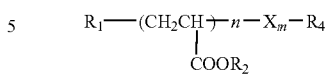

where $R_1$ is H; $R_4$ is a terminating group; X is

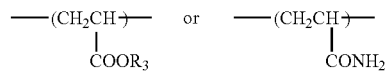

and $R_2$ and $R_3$ are each independently hydrogen, an alkali metal or an alkaline earth metal, and the sum of m and n provide a number average equivalent weight of less than 6500.

The term "terminating group" as used herein refers to the residual group resulting from the use of chain terminating agents in polymerization reactions. Such compounds are commonly refers to as capping agents. Illustrative examples of such terminating groups include hydrogen; hydroxyl, alkyl groups, especially those having from 1 to 4 carbons; and alkoxy groups, especially those having from 1 to 3 carbons. In one embodiment, $R_4$ will be either hydrogen or a hydroxyl group. In one exemplary embodiment, $R_4$ will be either hydrogen or a hydroxyl group.

As indicated above, while $R_2$ and $R_3$ may be hydrogen, in one exemplary embodiment, $R_2$ and $R_3$ will be either an alkaline earth metal or an alkali metal. In one especially exemplary embodiment, $R_2$ and $R_3$ will be an alkali metal such as potassium or sodium.

It will be appreciated that when m is zero or X is of the formula

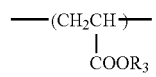

the stabilizing agent will be a homopolymer.

In one exemplary embodiment, the stabilizing agent will be of the formula:

wherein $R_1$, $R_2$, and $R_4$ are as defined above.

The stabilizing agents suitable for use herein may also be characterized by a number average molecular weight of less than 6500. In another embodiment, the stabilizing agents suitable for use herein will have a number average molecular weight of from about 1000 to about 4500. In one exemplary embodiment, the stabilizing agents suitable for use herein will have a number average molecular weight of from about 2000 to about 3400.

In general, the stabilizing agents may be used as 30 to 50% solutions in water. Solutions of 30 wt % to 50 wt % of suitable stabilizing agents employed will generally have pHs of from 1.5 to 3.5. In one exemplary embodiment, a solution of 30 wt % to 50 wt % of suitable stabilizing agent employed in the disclosed methods will have a pH of from 2.0 to 3.3. It will be appreciated that in one exemplary embodiment, as discussed below, the acid forms of the stabilizing agents will be neutralized in situ to provide the alkaline earth metal salt or alkali salt thereof.

Commercially available examples of suitable stabilizing agents include AR-257, AR-900, AR-900A, AR-921A, and AR-335 from ALCO Chemical of Chattanooga, Tenn. and Mayoquest 1500 or Mayoquest 1860 from Vulcan Chemical. In one exemplary embodiment, the disclosed coolant concentrates and coolant compositions will comprise AR-335.

In one embodiment, the disclosed coolant concentrates will generally comprise from 0.01 to 1.00 wt % of stabilizing agent, based on the total weight of the coolant concentrate. In another embodiment, the disclosed coolant concentrates will comprise from 0.01 to 0.50 wt % of stabilizing agent, based on the total weight of the coolant concentrate. In one exemplary embodiment, the disclosed coolant concentrates will comprise from 0.05 to 0.20 wt % of stabilizing agent, based on the total weight of the coolant concentrate.

In one embodiment, the disclosed coolant compositions (i.e., the concentrate plus sufficient water for dilution as discussed below) will generally comprise from 0.005 to 0.50 wt % of stabilizing agent, based on the total weight of the coolant composition. In another embodiment, the disclosed coolant compositions will comprise from 0.005 to 0.25 wt % of stabilizing agent, based on the total weight of the coolant composition. In one exemplary embodiment, the disclosed coolant compositions will comprise from 0.025 to 0.10 wt % of stabilizing agent, based on the total weight of the coolant composition.

The disclosed concentrates may be diluted with water to provide coolants. It is an aspect of the disclosed method that the water used for dilution need not be deionized water or softened water. Thus, in one embodiment, the water used for dilution is hard water. Hard water as used herein refers to water having greater than 150 ppm $CaCO_3$ total hardness.

The water is present in the disclosed coolant compositions, i.e., a diluted or final coolant, in an amount of about 1% to about 90% by weight in one embodiment, while in another embodiment, the water will be present in an amount of from about 30% to 70%, all based on the total weight of the coolant composition. In one exemplary embodiment, the water will be present in the disclosed coolants in an amount of about 40% to about 60% by weight, based on the total weight of the coolant composition.

It will be appreciated that the disclosed method is advantageous because the stabilized coolant concentrate can be diluted with hard water to provide a final coolant having an initial concentration of hard water salt insoluble precipitates that is less than would be seen without the use of the disclosed stabilizing agents and stabilized concentrates. In one embodiment, the disclosed method comprises diluting the stabilized coolant concentrate with hard water to provide a final coolant having an initial concentration of hard water insoluble precipitates of less than 50 ppm. "Initial concentration of hard water salt insoluble precipitates" as used herein refers to the amount of hard water salt insoluble precipitate formed within one to two hours of the hard water addition. In this embodiment, hard water refers to water having from 150 to 500 ppm $CaCO_3$ total hardness and an amount of stabilizer agent within the ranges discussed above. However, it will be appreciated that hard water with a hardness greater than 500 ppm $CaCO_3$ total hardness can be used with increasing amounts of the above disclosed stabilizing agents.

As discussed above, the final coolant composition will generally comprise a buffer or neutralizing agent sufficient to provide a final pH of from 7.0 to 11.0. In one embodiment, the buffer or neutralizing agent will be added in amount sufficient to provide a final pH of from 7.0 to 10.0. In one embodiment, the buffer or neutralizing agent will be added in amount sufficient to provide a final pH of from 8.0 to 10.0. Illustrative examples of common buffers and/or neutralizing agents are alkali metal hydroxides such as sodium hydroxide or potassium hydroxide.

Other optional additives that may be present in commercial antifreeze/coolants include, but are not limited to: wetting agents and surfactants such as, for example, ionic and/or non-ionic surfactants such as the poly(oxyalkylene) adducts of fatty alcohols; defoamers and/or lubricants such as polysiloxanes and polyoxyalkylene glycols; and other ingredients suitable for antifreeze/coolants that do not adversely affect the antifreeze/coolant characteristics sought to be achieved by the end use of the antifreeze/coolant.

Experimental data showing the benefits of using the instant invention are described in the example below.

EXAMPLE 1

Part A—Anti-Scaling Testing

In order to study the ability of the additives to function as an anti-scale agent a test method had to be developed to determine their effectiveness to stop the formation of scale in the presence of hard water. It was decided to test these materials as anti-scaling agent by a modified compatibility test outlined in Section 4.10 of General Motors specification GM6227M.

GM6227M Section 4.10 provides that samples of the coolant concentrate shall show no separation or precipitation when diluted with a synthetic hard water and tested as follows: prepare the hard water by adding 0.275 g of $CaCl_2$ to 1 L of the synthetic water described in ASTM D1384; mix 100 mL of the coolant concentrate plus 100 mL of the synthetic water (room temperature) in a 250 mL beaker, and allow to stand in the dark 24 h; make a second mixture, as above, heat to 82° C. and allow to cool to room temperature and to stand in the dark 24 h. Slight cloudiness is permitted; but formation of a precipitate is considered sufficient to interfere with bulk storage and use of the mixtures.

In the modified tests, the total hardness level used was twice the level given in the GM 6277M test method in order to look at worst case.

The results of the modified GM test at room temperature show the control, Coolant A, to give a precipitate. Coolant A is a conventional North American coolant comprising both silicate and phosphate corrosion inhibitors as well as additional inorganic acid based corrosion inhibitors.

Turning to the last two columns of Table 1, it can be seen that Alcosperse 124, Alcosperse 125, Alcosperse 725, Aquatreat AR-241, Versa TL-4, Versa TL-77 and Mayoquest C-100 gave similar results. These fluids were not further tested per the modified GM test at the higher temperature, 82° C. Narlex LD29, Narlex LD41, Alcosperse 149, Alcosperse 177, Alcosperse 408, Alcosperse 602-N, Aquatreat AR-4, Aquatreat AR-545, Aquatreat AR-550, Aquatreat AR-900-A, Aquatreat AR-921-A, Aquatreat AR-980, Mayoquest 1320 and Mayoquest 2100 showed no signs of precipitate but the fluid did become very slightly turbid as compared to the original solution. The Narlex LD30, Alcosperse 240, Alcosperse 420, Aquatreat AR-257, Aquatreat AR-335, Aquatreat AR-546 and Mayoquest 1500 showed no change and no sign of precipitate or turbidity.

All of the materials that showed no signs of precipitate were then tested at 82° C. The only material that behaved similar to the control was Mayoquest 2100. However, Mayoquest 1500 showed signs of heavy precipitate after 5 days. The modified GM test results are shown below in the last two columns of Table 1.

Part B—General Stability

The effect, if any, of these materials on the general stability of the antifreeze concentrate and their overall compatibility (long term) and solubility was evaluated as follows. The stabilizing agents were all added to the control antifreeze at the level (0.1 wt %) for long term stability. The results are set forth in Table 2 which provides the 4 month storage stability results for various additives with the control antifreeze at three different temperature (Room temperature=RT, 130° F., and 100° C.).

Coolant A was again used as a control. At room temperature all of the materials tested exhibited the same stability as the control. All the same remained homogenous (no separation or discoloration).

After 3 months at 130° F. the control showed a very slight white precipitate at the bottom of the sample. All of the samples containing the various additives were stable showing no signs of precipitation, separation or discoloration after 4 months.

At 100° C., the control showed a heavy precipitate after 24 hours. Many of the samples containing the additives show a similar behavior.

Alcosperse 149, Mayoquest 1320 and Mayoquest 2100 did not form precipitates until 48 hours.

Alcosperse 420, Aquatreat AR-247, Aquatreat AR-335, Aquatreat AR-900-A, Aquatreat AR-921-A, Mayoquest 1500 and Mayoquest 1860 did not start to show any sign of precipitation until 5 days or longer (see chart for details on each materials). Heavier precipitate was not noticed until 9 days in some cases. The Mayoquest 1860 color shifted (to a light brown after 12 days) and a precipitate formed after 21 days. The Alcosperse 420 did not change after day 5. Mayoquest 1500 showed no signs of precipitation over the 4-month test.

The test results show that some of these additives had the unique ability of stabilizing inhibitor package in the antifreeze concentrate from precipitating out at evaluated temperature. The precipitation of inhibitor package has posed a problem for the antifreeze concentrate when stored in warehouse in the hot summer months and in other situations of long-term storage. Once inhibitors fallout it is sometimes hard to get them back into solution. Any fallout of inhibitors results in a decreased amount of active inhibitors in the antifreeze and can destabilize the whole inhibitor package.

The addition of these stabilizer materials provides a way a preventing this from happening and ensuring the correct concentration of a stable inhibitor package is available when the coolant is diluted for use.

Part C—Additional Test Results

In order to evaluate the effect these materials might have on other performance requirements of the engine coolant, several of the candidates were tested in corrosion tests (ASTM tests) developed by the automotive industry. The results of the testing are also set forth in the bottom portion of Table 2. The results show the additives are not adversely affecting the performance of the antifreeze as compared to the control, Coolant A.

In addition to the ASTM testing, some in-house testing of some candidates formulas were conducted in an MTU-HSSD test unit. This test looks at the ability of the additives to prevent scale build-up in the test unit. The results obtained from the unit to date are also set forth in the bottom portion of Table 2.

TABLE 1

ANTI-SCALING ADDITIVE TESTS
4-MONTH RESULTS

| Stabilizing Agent Added to Coolant A | RT Stability* | 130 F. Stability* | 100 C. Stability | GM RT Hard H2O | GM 82 C. Hard H2O |
|---|---|---|---|---|---|
| Control - No Stabilizing Agent | ok @16 wk | sl wispy ppt(7 wk) | ppt (24 hr) | ppt | Mod ppt |
| Narlex LD29 | ok @8 wk | ok @8 wk | ppt (24 hr) | sl turb | v sl ppt |
| Narlex LD30 | ok @8 wk | ok @8 wk | ppt (24 hr) | clr | v sl ppt |
| Narlex LD41 | ok @8 wk | ok @8 wk | ppt (24 hr) | sl turb | v sl ppt |
| Alcosperse 124 | ok @8 wk | ok @8 wk | ppt (24 hr) | ppt | |
| Alcosperse 125 | ok @8 wk | ok @8 wk | ppt (24 hr) | sl turb | v sl ppt |
| Alcosperse 149 | ok @8 wk | ok @8 wk | ppt (48 hr) | sl turb | |
| Alcosperse 177 | ok @8 wk | ok @8 wk | ppt (24 hr) | sl turb | v v sl ppt, sl turb |
| Alcosperse 240 | ok @8 wk | ok @8 wk | ppt (24 hr) | clr | v v sl ppt, clear |
| Alcosperse 408 | ok @8 wk | ok @8 wk | ppt (24 hr) | sl turb | v sl ppt |
| Alcosperse 420 | ok @16 wk | ok @16 wk | lint(5days) | clr | v v sl ppt, sl turb |
| Alcosperse 602-N | ok @8 wk | ok @8 wk | ppt (24 hr) | sl turb | v v sl ppt, clear |
| Alcosperse 725 | ok @8 wk | ok @8 wk | ppt (24 hr) | ppt | |
| Aquatreat AR-4 | ok @8 wk | ok @8 wk | ppt (24 hr) | sl turb | v sl ppt, |
| Aquatreat AR-241 | ok @8 wk | ok @8 wk | ppt (24 hr) | ppt | |
| Aquatreat AR-257 | ok @16 wk | ok @16 wk | lint(5 days)/ ppt(9 days) | clr | v sl ppt |
| Aquatreat AR-335 | ok @16 wk | ok @16 wk | lint(6 days)/ ppt(12 days) | clr | v v sl ppt, clear |

TABLE 1-continued

ANTI-SCALING ADDITIVE TESTS
4-MONTH RESULTS

| Stabilizing Agent Added to Coolant A | RT Stability* | 130 F. Stability* | 100 C. Stability | GM RT Hard H2O | GM 82 C. Hard H2O |
|---|---|---|---|---|---|
| Aquatreat AR-545 | ok @8 wk | ok @8 wk | ppt (24 hr) | sl turb | v sl ppt |
| Aquatreat AR-546 | ok @8 wk | ok @8 wk | ppt (24 hr) | clr | v sl ppt |
| Aquatreat AR-550 | ok @8 wk | ok @8 wk | ppt (24 hr) | sl turb | v v sl ppt, clear |
| Aquatreat AR-900-A | ok @16 wk | ok @16 wk | lint(5 days)/ ppt(9 days) | sl turb | v v sl ppt, clear |
| Aquatreat AR-921-A | ok @16 wk | ok @16 wk | lint(6 days)/ ppt(9 days) | sl turb | v v sl ppt, clear |
| Aquatreat AR-980 | ok @8 wk | ok @8 wk | ppt (24 hr) | sl turb | v sl ppt |
| Versa TL-4 | ok @8 wk | ok @8 wk | ppt (24 hr) | ppt | |
| Versa TL-77 | ok @8 wk | ok @8 wk | ppt (24 hr) | ppt | |
| Mayoquest C-100 | ok @8 wk | ok @8 wk | ppt (24 hr) | ppt | |
| Mayoquest 1320 | ok @8 wk | ok @8 wk | ppt (24 hr) | sl turb | v v sl ppt, sl turb |
| Mayoquest 1500 | ok @16 wk | ok @16 wk | | clr | v sl ppt/ svr ppt |
| Mayoquest 1860 | ok @16 wk | ok @16 wk | color shift (12days) | | v v sl ppt, clear |
| Mayoquest 2100 | ok @8 wk | ok @8 wk | ppt (48 hr) | sl turb | mod ppt |

*Those samples that failed the 100 C. and GM Hard H₂O tests had their RT and 130 P tests terminated after eight weeks.
**Hard H₂O tests run according to the GM6277M:RKETSGID test method (except salt level doubled).

TABLE 2

Overview of Anti-Sealing Additive Testing

| | Control-Coolant A w/o Stabilizing Agent | Aleo-sperse 420 | Aquatreat AR-257 | Aquatreat AR-335 | Aquatreat AR-900-A | Aquatreat AR-921-A | Mayoquest 1500 | Mayoquest 1860 |
|---|---|---|---|---|---|---|---|---|
| RT Stability | ok | ok | ok | ok | ok | ok | ok | ok |
| 130 F. Stability | ok | ok | ok | ok | ok | ok | ok | ok |
| 100 C. | phos, ppt, no gels | | moderate gel | moderate gel | slight gel | sl/mod gel/ lt number | moderate gel | |
| GM Hard Water Text (RT) | sl, ppt | ok | ok | ok | ok | ok | ok | ok |
| GM Hard Water Text (82 C.) | mod ppt | v sl ppt, sl turb | v sl ppt | v v sl ppt | v v sl ppt | v v sl ppt | | v v sl ppt |
| ASTM D-4340 (mg/cm2/wk) | 0.1561 | 0.0672 | 0.1321 | 0.3002 | 0.0072 | 0.0048 | | |
| ASTM D-1384 | 115.2 | 104.7 | 76.6 | 87.9 | 91.7 | 85.8 | | 59.2 |
| Cu | 2.3 | 0.5 | 0.5 | 1.5 | 0.9 | 1.7 | | 6.8 |
| ASTM solder | −0.6 | −1.2 | −1.9 | −1.7 | −1.7 | −0.4 | | 0.3 |
| brase | 2.2 | 0.1 | 0.4 | 1.8 | 1.4 | 1.7 | | 3.6 |
| steel | 1.3 | −0.2 | −0.1 | 0.6 | 0.3 | 1.1 | | 1.0 |
| cast Fe | 3.3 | 2.6 | 4.2 | 1.5 | 2.1 | 3.8 | | 3.7 |
| cast Al | 0.4 | −2.9 | 1.8 | 2.6 | 2.0 | 1.9 | | 13.3 |
| ASTM D-2809 (P-I-C) | 10-9-9 | | 10-9-10 | 10-9-9 | 10-9-9 | 10-9-9 | | |
| ASTM D-2570 | 48.2 | | 94.4 | 82.7 | 151.8 | 96.9 | | |
| Cu | 7.6 | | | 16.8 | 14.5 | 15.3 | | |
| ASTM solder | −1.2 | | −12.1 | −0.5 | −7.4 | −4.0 | | |
| brase | 2.5 | | 10.8 | 2.8 | 5.8 | 8.3 | | |
| steel | −0.1 | | −0.1 | 0.6 | 0.8 | 0.2 | | |
| cast Pe | −2.4 | | −1.2 | 0.6 | 1.4 | 0.7 | | |
| cast Al | −2.8 | | −3.1 | −1.9 | −2.1 | −2.8 | | |
| ASTM D-1881 (33%) ml/sec. | 35/1 | | 25/<1 | 25/<1 | 25/<1 | 20/<1 | | |

TABLE 2-continued

Overview of Anti-Sealing Additive Testing

|  | Control-Coolant A w/o Stabilizing Agent | | Aleosperse 420 | Aquatreat AR-257 | | Aquatreat AR-335 | | Aquatreat AR-900-A | | Aquatreat AR-921-A | | Mayoquest 1500 | Mayoquest 1860 | |
|---|---|---|---|---|---|---|---|---|---|---|---|---|---|---|
| ASTM D-1882 (conc.) | clearcoat-pass non-clearcoat-pass | | | clearcoat-pass non-clearcoat-pass | | clearcoat-pass non-clearcoat-pass | | clearcoat-pass non-clearcoat-pass | | clearcoat-pass non-clearcoat-pass | | | Coolant A Control Deionized Water | |
| MTU-HSSD (mg deposit) | 139 | | mg deposit | 172 | | 203 | | | | 143 | | mg deposit | 10 | |
| Change in pH | 9.9 | 9.8 | pH | 9.7 | 9.7 | 9.2 | 9.1 | 9.2 | 9.1 | | | pH | 10.3 | 10.1 |
| RA | 7.24 | 6.58 | RA | 7.00 | 7.31 | 7.25 | 7.01 | 7.21 | 6.94 | | | RA | 6.41 | 5.69 |
| TTZ | 283 | 276 | TTZ | 284 | 283 | 265 | 265 | 268 | 278 | | | TTZ | 288 | 241 |
| $NO_3$ | 714 | 718 | NO3 | 764 | 771 | 789 | 778 | 812 | 809 | | | NO3 | 762 | 653 |
| B | 326 | 317 | B | 324 | 328 | 343 | 335 | 335 | 329 | | | B | 339 | 280 |
| Ca | 112 | 17 | Ca | 114 | 129 | 119 | 120 | 91 | 120 | | | Ca | | |
| Mg | 19 | 3 | Mg | 18 | 19 | 18 | 18 | 16 | 19 | | | Mg | | |
| Na | 2478 | 2404 | Na | 2543 | 2652 | 3002 | 2873 | 2866 | 2879 | | | Na | 2794 | 1972 |
| P | 870 | 777 | P | 841 | 849 | 896 | 873 | 857 | 859 | | | P | 882 | 734 |
| Si | 300 | 107 | Si | 297 | 253 | 296 | 259 | 311 | 271 | | | Si | 305 | 224 |

Part D—HSSD Results

Additional testing was conducted on an HSSD unit. The basic HSSD test method consists of cleaning the instrument with an EDTA solution for an hour at a bulk fluid temperature of 140° F. The valve that controls the flow rate is fully opened, and the heater voltage is set at 80V. The actual test consists of flowing 13 liters of a 50% aqueous coolant solution at a temperature of 190° F. and at a flow rate of 3 gpm. The heater voltage is set at 196V. The entire system pressurizes to 8 to 12 PSI, which is the natural vapor pressure form heating the water and the glycol. The test solution is run for 96 hours. Examination of the test specimen surface for scale deposit is visually examined and a sample of the before and after test coolant is submitted to analytical for analysis.

The visual examination of the test specimen surfaces without stabilizing additives showed that they were covered with a hard water salt scale to an unacceptable degree. The visual examination of the test specimen surfaces with stabilizing additives showed that the surfaces were clean and were not covered with a hard water salt scale to an visually appreciable degree.

Table 3 shows the analytical analysis of the samples. In all cases, the fluid was Coolant A to which the particularly identified stabilizing agents were added as indicated. The runs without the stabilizing additives have lower total hardness values only because these samples resulted in unacceptable precipitation throughout the unit that severely reduced the flow of coolant throughout the system.

TABLE 3

| Run # | Hardness | Stabilizing Agent | Heater Deposit | Rinse Deposit | Total Deposit | Coolant Flow Through HSSD unit. |
|---|---|---|---|---|---|---|
| 1* | 450 ppm | None | 84 mg | 15 mg | 99 mg | Impeded |
| 2 | 450 ppm | AR-335 | 167 mg | 5 mg | 172 mg | Unchanged |
| 3 | 450 ppm | None | 85 mg | 54 mg | 139 mg | Impeded |
| 4 | 0 ppm | None | 7 mg | 2.5 mg | 9.5 mg | Impeded |
| 5 | 450 ppm | AR-900 | 199 mg | 3.7 mg | 202.7 mg | Unchanged |
| 6 | 450 ppm | AR-921-A | 137 mg | 5.6 mg | 142.6 mg | Unchanged |
| 7 | 450 ppm | None | 72 mg | 55 mg | 127 mg | Impeded |

*= Run stopped during the test period

EXAMPLE 2

Additional stability tests as conducted above in Example 1, Parts A and B were conducted on additional coolants. Coolants B and C were prepared as indicated below in Tables 4 and 5. The stabilizing agents were added to the particularly identified coolant, i.e, either Coolant B or Coolant C, at a level of 0.1 wt %), based on the total weight of the coolant.

TABLE 4

| Coolant B | wt. % | grams |
|---|---|---|
| Ethylene Glycol | 78.9691 | 3158.77 |
| NaOH - 50% | .7348 | 29.39 |
| NaTT2 - 50% | .5000 | 20.00 |
| Sodium Benzoate, 15% in EG | 16.6667 | 666.67 |
| Tenax WS-5520 | .2000 | 8.00 |
| Corrosion inhibitor | 2.000 | 80.00 |
| $H_3PO_4$, 75% | .6001 | 24.00 |
| --Anti-Scale--omitted-- | [.0893] | [3.57] |
| --Colorant--omitted-- | [.0400] | [1.60] |
| --Additive--omitted-- | [.2000] | [8.00] |
| | 100.0000 | 4000.00 |

TABLE 5

| Coolant C | wt. % | grams |
|---|---|---|
| Ethylene Glycol | 95.6743 | 3,826.97 |
| Borax, 20% in EG | 1.9875 | 79.50 |
| NaOH 50% | 1.0528 | 42.11 |
| $H_3PO_4$ - 75% | .6602 | 26.41 |
| NaTT2 - 50% | .1165 | 4.66 |
| Corrosion inhibitor | .5000 | 20.00 |
| --Colorant--omitted-- | [.0020] | [.08] |
| --Additive--omitted-- | [.0067] | [.27] |
| | 100.0000 | 4,000.00 |

It can be seen from Table 6 and Table 1 that the disclosed stabilizers and coolant compositions function independent of corrosion inhibitor, i.e., whether the corrosion inhibitor comprises silicates and phosphates as well as additional corrosion inhibitors, i.e., Coolant A, or phosphates and additional corrosion inhibitors, i.e., Coolants B and C.

TABLE 6

| | Coolant B GM Hard Water Test | | | Coolant C GM Hard | | |
|---|---|---|---|---|---|---|
| Water Test | 100° C. (a) | RT (24 hr) | 82 C. (48 hr) | 100° C. | RT (24 hr) | 82 C. (48 hr) |
| Control | sev floc | sev ppt | sev ppt | sl/mod crystalline ppt | sev ppt | sev ppt |
| Alcosperse 149 | mod floc | sl turb | clear | slight floc | v sl turb | sl turb |
| Alcosperse 240 | sev floc | sl turb | v v sl turb | sev floc | v sl turb | sl turb |
| Alcosperse 420 | clear | sl turb | sl turb | clear | v sl turb | sl turb |
| Alcosperse 602-N | sev floc | v sl turb | clear | sev floc | v sl turb | sl turb |
| Aquatreat AR-257 | clear | v sl turb | clear | clear | v sl turb | sl turb |
| Aquatreat AR-335 | clear | v v sl turb | clear | clear | v sl turb | clear |
| Aquatreat AR-546 | sev floc | sl turb | v sl turb | sev floc | v sl turb | sl turb |
| Aquatreat AR-900-A | clear | v v sl turb | clear | clear | v sl turb | v sl turb |
| Aquatreat AR-921-A | mod to sev floc | v v sl turb | clear | slight floc | v sl turb | clear |
| Aquatreat AR-980 | sev floc | sl turb | turbid | sev floc | v sl turb | sl turb |

The invention claimed is:

1. A coolant concentrate having improved storage stability, the concentrate consisting of:
   at least 90 wt % freezing point depressant, based on the total weight of the coolant concentrate;
   at least one phosphate or the alkali metal or alkaline earth metal salt thereof, a nitrite, and one or more corrosion inhibitors selected from the group consisting of organic acids; azole type compounds; nitrates; borates; benzoates; molybdates, and alkali metal or alkaline earth metal salts thereof;
   at least one stabilizer selected from the group consisting of polyacrylate polymers of the formula:

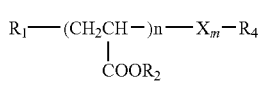

where $R_1$ is H; $R_4$ is a terminating group; X is

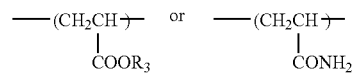

and $R_2$ and $R_3$ are each independently hydrogen, an alkali metal or an alkaline earth metal, and the sum of m and n provide a number average equivalent weight of less than 6500, and
   optionally at least one additive selected from the group consisting of water, antifoam agents, lubricants, colorants, dispersants, anti-scaling agents, wetting agents, surfactants, pH adjusting and buffering agents.

2. The concentrate of claim 1 wherein $R_4$ is H or OH.

3. The concentrate of claim 2 wherein $R_4$ is H.

4. The concentrate of claim 1 wherein $R_2$ is an alkali metal or an alkaline earth metal.

5. The concentrate of claim 4 wherein $R_2$ is an alkali metal.

6. The concentrate as in claim 1 wherein the at least one stabilizer comprises 0.01 wt % to 1.00 wt % of the concentrate, based on the total weight of the concentrate.

7. The concentrate of claim 1 wherein an organic acid and a nitrite are present in the concentrate.

8. The concentrate as in claim 1 wherein the one or more corrosion inhibitors comprise 0.10 wt % to 10 wt % of the concentrate, based on the total weight of the concentrate.

9. A method for preventing hard water salt formation upon dilution of a coolant concentrate with water, comprising diluting the concentrate of claim 1 with water to provide a final coolant comprising from 1 to less than 90 wt % water.

10. The method of claim 9, comprising diluting the concentrate of claim 1 with water to provide a final coolant comprising from 30 to about 70 wt % water.

11. The method of claim 10, comprising diluting the concentrate of claim 1 with water to provide a final coolant comprising from 40 to about 60 wt % water.

12. The method of claim 9 comprising diluting the concentrate of claim 1 with hard water.

13. The method of claim 12 wherein the final coolant has an initial concentration of hard water salt insoluble precipitates of less than 50 ppm.

14. The method of claim 9 wherein the pH of the final coolant is 7.0 to 10.

15. The method of claim 9 wherein the at least one stabilizer comprises 0.005 wt % to 0.5 wt % of the final coolant, based on the total weight of the final coolant.

16. A method of stabilizing a coolant, comprising adding to a coolant at least one stabilizer selected from the group consisting of polyacrylate polymers of the formula:

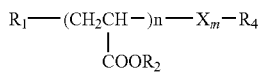

where $R_1$ is H; $R_4$ is a terminating group; X is

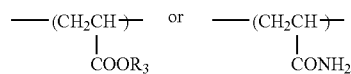

and $R_2$ and $R_3$ are each independently an alkali metal or an alkaline earth metal, and the sum of m and n provide a number average equivalent weight of less than 6500, wherein the coolant consists of a freezing point depressant, at least one phosphate or the alkali metal or alkaline earth metal salt thereof; a nitrite, one or more corrosion inhibitors selected from the group consisting of organic acids; azole type compounds; nitrates; borates; benzoates; molybdates, and alkali metal or alkaline earth metal salts thereof, and optionally at least one additive selected from the group consisting of water, antifoam agents, lubricants, colorants, dispersants, anti-scaling agents, wetting agents, surfactants, pH adjusting and buffering agents.

17. The method as in claim 16 wherein the at least one stabilizer is added as a stabilizer solution having a pH from 1.5-3.5.

18. The method as in claim 16 wherein the at least one stabilizer comprises 0.01 wt % to 1.00 wt % of the coolant, based on the total weight of the coolant.

19. A method of stabilizing an engine coolant concentrate and preventing hard water salt formation upon dilution of the coolant concentrate with hard water, comprising adding to a coolant concentrate, at least one stabilizer selected from the group consisting of polyacrylate polymers of the formula:

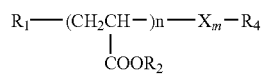

where $R_1$ is H; $R_4$ is a terminating group; X is

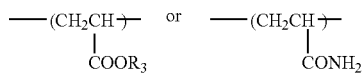

and $R_2$ and $R_3$ are each independently hydrogen, an alkali metal or an alkaline earth metal, and the sum of m and n provide a number average equivalent weight of less than 6500, to provide a stabilized coolant concentrate, and diluting the stabilized coolant concentrate with hard water to provide a final coolant, wherein the coolant concentrate consists of at least 90 wt % freezing point depressant, based on the total weight of the coolant concentrate; at least one phosphate or the alkali metal or alkaline earth metal salt thereof, a nitrite and one or more corrosion inhibitors selected from the group consisting of organic acids; azole type compounds; nitrates; borates; benzoates; molybdates, and alkali metal or alkaline earth metal salts thereof and optionally at least one additive selected from the group consisting of water, antifoam agents, lubricants, colorants, dispersants, anti-scaling agents, wetting agents, surfactants, pH adjusting and buffering agents.

20. The method of claim 19 wherein final coolant has an initial concentration of hard water salt insoluble precipitates of less than 50 ppm.

* * * * *